United States Patent
Andreasen

(10) Patent No.: US 8,332,596 B2
(45) Date of Patent: Dec. 11, 2012

(54) MULTIPLE ERROR MANAGEMENT IN A MULTIPROCESSOR COMPUTER SYSTEM

(75) Inventor: Clayton D. Andreasen, Chippewa Falls, WI (US)

(73) Assignee: Cray Inc., Seattle, WA (US)

( * ) Notice: Subject to any disclaimer, the term of this patent is extended or adjusted under 35 U.S.C. 154(b) by 785 days.

(21) Appl. No.: 12/484,164

(22) Filed: Jun. 12, 2009

(65) Prior Publication Data

US 2010/0318751 A1 Dec. 16, 2010

(51) Int. Cl.
*G06F 12/00* (2006.01)
*G06F 11/00* (2006.01)
(52) U.S. Cl. .................. 711/154; 711/E12.001; 714/48; 714/E11.025
(58) Field of Classification Search .................. 711/154, 711/E12.001; 714/48, E11.025
See application file for complete search history.

(56) References Cited

U.S. PATENT DOCUMENTS

| 2003/0078987 | A1* | 4/2003 | Serebrennikov | 709/217 |
| 2006/0242335 | A1* | 10/2006 | Poisner et al. | 710/52 |
| 2009/0249356 | A1* | 10/2009 | He et al. | 719/314 |
| 2010/0306426 | A1* | 12/2010 | Boonstra et al. | 710/57 |

* cited by examiner

*Primary Examiner* — Yaima Campos
*Assistant Examiner* — Mehdi Namazi
(74) *Attorney, Agent, or Firm* — Perkins Coie LLP

(57) ABSTRACT

An error message handling buffer comprises a first buffer and a second buffer. A first index is associated with the first buffer and a second index is associated with the second buffer. A buffer controller is operable to write and read messages in the buffer, such that messages are written to the buffer of the first and second buffers that has a buffer index value lesser than the buffer size, and read from the other of the first and second buffers, the other buffer having an index value greater than or equal to the buffer size.

27 Claims, 2 Drawing Sheets

MULTIPLE ERROR MANAGEMENT IN A MULTIPROCESSOR COMPUTER SYSTEM

FIELD OF THE INVENTION

The invention relates generally to multiprocessor computer systems, and more specifically to a multiple error management in a multiprocessor computer system.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors runs software that is operable to assign tasks to other processors or to split up a task so that it can be worked on by multiple processors at the same time. In such systems, the data being worked on is typically stored in memory that is either centralized, or is split up among the different processors working on a task.

Instructions from the instruction set of the computer's processor or processor that are chosen to perform a certain task form a software program that can be executed on the computer system. Typically, the software program is first written in a high-level language such as "C" that is easier for a programmer to understand than the processor's instruction set, and a program called a compiler converts the high-level language program code to processor-specific instructions.

In multiprocessor systems, the programmer or the compiler will usually look for tasks that can be performed in parallel, such as calculations where the data used to perform a first calculation are not dependent on the results of certain other calculations such that the first calculation and other calculations can be performed at the same time. The calculations performed at the same time are said to be performed in parallel, and can result in significantly faster execution of the program. Although some programs such as web browsers and word processors don't consume a high percentage of even a single processor's resources and don't have many operations that can be performed in parallel, other operations such as scientific simulation can often run hundreds or thousands of times faster in computers with thousands of parallel processing nodes available.

The program runs on multiple processors by passing messages between the processors, such as to share the results of calculations, to share data stored in memory, and to configure or report error conditions within the multiprocessor system. Communication between processors is an important part of the efficiency of a multiprocessor system, and becomes increasingly important as the number of processor nodes reaches into the hundreds or thousands of processors, and the processor network distance between two processors becomes large.

The network connection scheme or topology that links the processors, the speed and data width of the network connections, and the efficiency of the messaging protocols used are among the factors that play significant roles in how efficiently the processor interconnect network can handle tasks such as launching a program, retrieving data from remote memory, or sending other messages between processors working together to execute a program.

SUMMARY

One example embodiment of the invention comprises an error message handling buffer comprising a first buffer and a second buffer. A first index is associated with the first buffer and a second index is associated with the second buffer. A buffer controller is operable to write and read messages in the buffer, such that messages are written to the buffer of the first and second buffers that has a buffer index value lesser than the buffer size, and read from the other of the first and second buffers, the other buffer having an index value greater than or equal to the buffer size.

DETAILED DESCRIPTION

Figure 1:
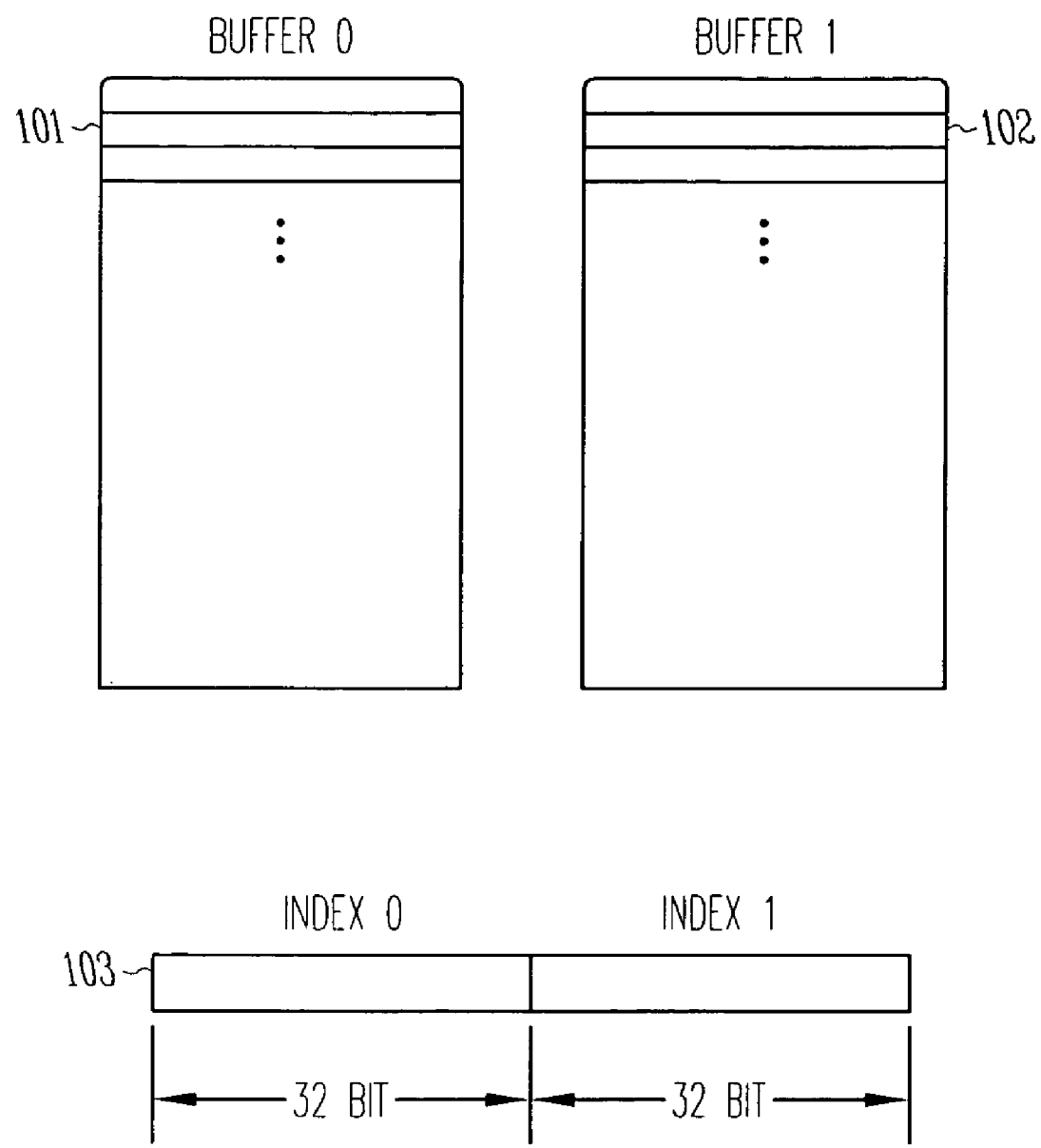
FIG. 1 shows a hardware error management buffer and index, consistent with an example embodiment of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

Computers typically perform tasks or run software programs by executing program instructions in a processor. The computer also uses a variety of computer peripheral components such as video interfaces, storage, and network interfaces to perform various functions, some of which have their own dedicated processors to perform specialized functions at the instruction of the computer's main processor. But, the extent of a computer's ability to perform tasks quickly, or to perform a large number of tasks at the same time, is generally limited by the capabilities of the computer's processor. While processor technology has kept pace with computing demands of the typical personal computer user, large computers used for scientific research and other complex tasks require significantly more computing power to perform large and complex tasks in a reasonable amount of time.

Large computer systems and supercomputers typically therefore use many processors in the same computer system, and use various methods of dividing the work to be done among the processors. Typically, a software program that has been written or compiled to run on a computer with multiple processors will use each processor assigned to the program to execute different parts of the software program or perform different calculations, and to communicate the results of each portion of the program back to a central processor. In other examples, different programs running at the same time run on different groups of processors, as assigned by a control program executing on the computer system.

Parallelization is managed by various components of the computer system, including the compiler, the individual processor elements and their processor network interfaces, and the operating system for the parallel computer system. These system elements ensure that the processors are performing tasks in the proper order, and that operations that rely on data from other processors utilize data that has already been properly computed but that is not out-of-date. They also control the passing of information between processors, such as sending program instructions to each processor, updating data, and sending results back to other processors.

The processors working in parallel on a program or task communicate information with one another via a processor interconnect network, which typically includes several connections from each processor to different neighboring processors. The network is used to distribute software instructions to be run on the various processors, to exchange messages such as memory contents and program results with other processors, and to perform other communication functions. Typical network configurations resemble cubes, toroids, or other shapes, often with extra connections linking one side of the network to another for added communication efficiency.

Computers such as this are often called parallel processing computers, multiprocessor computers, or if large numbers such as hundreds or thousands of processors are used, massively parallel computer systems. Such systems are able to take complex tasks that can be performed in parallel, divide the work among many processors, and combine the work of the many processors to perform a task hundreds or thousands of times faster than could be achieved with traditional single-processor computer systems.

The performance of a parallel computer system is based on a variety of factors, including the extent to which a program can be executed in parallel, the performance of the individual processors, and the efficiency of the operating system and network that link the processors together. A variety of other factors, such as memory and storage performance, and the accuracy and efficiency of locally cached copies of data, also play significant roles in determining a parallel computer's performance.

Even very large and complex multiprocessor computer systems often use commonly available processors, memory, and other components, sometimes much like those found in personal computers and servers. As hundreds or thousands of commercial quality components are used to build a multiprocessor computer system, the chances of a component failure somewhere in the system become dramatically larger over a given time period than for a typical personal computer or server. A variety of data integrity methods are therefore often used to detect and sometimes correct errors in multiprocessor systems, such that a large multiprocessor computer system that is itself relatively reliable can be assembled from relatively unreliable parts.

Passing error messages and efficient processing of error messages is an important part of multiprocessor systems, and becomes increasingly important as the size of the system becomes very large. Some errors are recoverable by using error correction codes or other methods, while others are detectable but cannot be recovered. Error conditions are also used to determine the operational state of various components of the multiprocessor system, such as to shut down a malfunctioning processor node, network link, or memory location.

FIG. 1 shows an error message processing queue architecture, consistent with an example embodiment of the invention. The buffers in this example are used to buffer error messages in a hardware error handling module in a multiprocessor computer system by storing incoming error messages until they can be read and processed. The buffer is split into two parts, such that Buffer 0 shown at 101 and buffer 1 shown at 102 operate as separate buffers for receiving and buffering incoming error messages. Each buffer can be read or written, but in this example only one is available for writing at any given time and the other buffer is available to be read. The error buffer therefore doesn't need to lock while error messages are being read or processed, and the error handling system can receive and buffer error messages in one buffer while processing error messages from the other buffer.

The buffers are controlled in this example by atomic memory operations on a single 64-bit memory word, which serves as an index to both buffers. This word is split into a first 32-bit index 0 as shown at 103 and a second 32-bit index 1 as shown at 104 of FIG. 1, such that the first 32 bits (index 0) serve as an index to buffer 0 and the second 32 bits (index 1) serve as an index to buffer 1. In this example, the high order bits are shown at 103 and the low order bits are shown at 104.

Index 0 is initialized with the value of zero, and index 1 is initialized with a value that is the size of the buffers. When incremented, buffer 0 will point to the next available buffer location in buffer 0, and because index 1 is the size of buffer 0, when incremented it will point to the next available buffer location in buffer 1. To queue an error message for processing by performing a buffer write, a fetch and increment instruction is performed on the 64-bit index word using the hex value 0x100000001, which adds one to both the high order index 0 word at 103 and the low order index 1 word at 104.

In this example, buffer 0 is available for writing, as its index value is less than the buffer size, while buffer 1 is not available for writing but is currently available to for error messages to be read and processed. When the writer performs an atomic fetch and increment on the index word resulting in adding one to both the index 0 and index 1 portions of the index word, the writer observes the results of the atomic fetch and increment operation. In one example, it determines that one index value is lower than the other, and writes to the buffer location associated with the index value that is lower. In another embodiment, the writer determines that one index value is lower than the buffer size and one is greater than the buffer size, and writes to the buffer associated with the index that is smaller than the buffer size at the buffer location indicated by that index value.

The buffer having an index value greater than the buffer size is available to be read, so that error messages can be processed while new error messages are written to the other buffer. Certain events will trigger switching which buffer is read and which buffer is written, such as completing processing of error messages in the buffer being read, a timer indicating a switch should be made, or an interrupt or other event triggering changing buffers. To change which buffer is read and which buffer is written, the current buffer values are loaded and are changed using an atomic swap operation, such that the index that previously had a value lower than the buffer size has a new value that is the same as the buffer size, and the index that previously had a value greater than the buffer size is reset to zero.

This assumes that the buffer index for the buffer previously having a value greater than the buffer size has been completely read, and that all buffer locations are available. In alternate embodiments, the new index value is altered to reflect the first available buffer location, taking into account unread error messages still stored in the buffer as indicated by the reader.

The index of the buffer previously being read is also used in some embodiments by the reader to know how many error messages are queued and need to be processed, as the index will be altered by the writer even when the buffer is being read and not available for writing. In an alternate embodiment, the reader starts processing messages from the last buffer entry to the first, and if unprocessed error messages remain when the buffer being read becomes the buffer available for writing again the value is coded in the initial index value of the newly written buffer to indicate the first available buffer location for writing.

To read the buffer and process error messages, the reader reads messages sequentially from the buffer having a buffer index value greater than the buffer size. In this example, the buffer size is not altered during the buffer read operation, as the reader knows how many entries are in the buffer being read from the size of the index value when index sizes changed to swap which buffer is being read and which buffer is being written.

If the reader allows one or both of the buffers to fill up, the writer can detect this by finding values that are one less than the buffer size for the index of the buffer being written, and one less than twice the buffer size for the index of the buffer being read. The writer can then elect to hold the message and retry sending it, may generate another error or fault condition, or may simply give up in its effort to write the error message.

Further the index value for the buffer being written will in some embodiments overflow into the buffer being read, as the low order index value can overflow into the high order index if the value exceeds what can be encoded in 32 bits. In further embodiments, the size of the index and of the buffers is modified based on the anticipated capacity needs of the error message buffer, such that it is sufficiently unlikely for the buffer to fill up.

In the above example, it is also possible for a message write process to increment the index using the atomic fetch and increment instruction before writing the message data to the corresponding buffer location. This can create a race condition wherein the reader can read the message from the buffer location before the writer has stored the message in the buffer. To detect this condition, the last part of the message written into the buffer locations is a "done" flag, indicating that the message is complete and can be read. The reader therefore must check this flag to ensure that the message being read from the buffer location is valid, and can retry, wait, or perform other operations if the buffer location is not yet valid.

Figure 2:
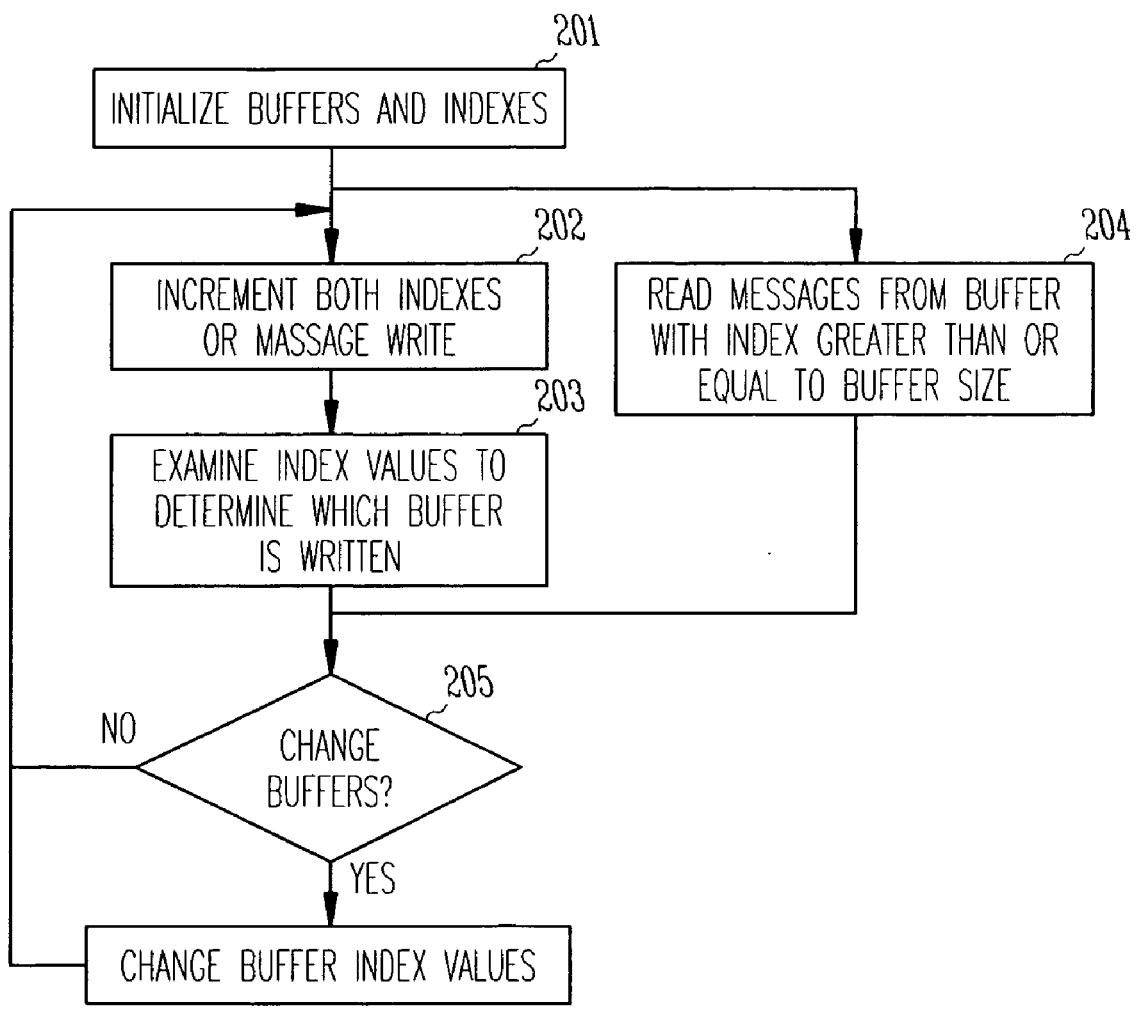
FIG. 2 is a flowchart illustrating a method of handling multiple errors in a computer system, consistent with an example embodiment of the invention.

FIG. 2 is a flowchart, illustrating an example method of operating a dual indexed buffer such as that of FIG. 1, consistent with an example embodiment of the invention. At 201, buffers 0 and 1 are initialized. Corresponding index 0 is set to a value of 0, and index 1's value is set to the buffer size. Once buffer initialization is complete, buffer 0 can be written, and buffer 1 can be read.

Each time an error message is written, the index 0 and index 1 are both incremented by 1 at 202, and the message is written to whichever buffer corresponds to the index having a value less than the buffer size at 203. Simultaneously, the read process reads messages from the buffer having an index value greater than the buffer size at 204, until all messages have been read.

At 205, an event such as a timer, an interrupt, or a buffer capacity level selectively triggers swapping which buffer is available to be written and which buffer is being read. To perform the read/write buffer swap, the current buffer values are loaded and are changed, such that the index that previously had a value lower than the buffer size has a new value that is the same as the buffer size, and the index that previously had a value greater than the buffer size is reset to zero at 206. When the buffer values are reinitialized as described in the example of FIG. 1, reading and writing can resume at 202 and 204 as before.

The examples shown here illustrate how a message read buffer can be used to handle error messages in a computer system, using a unique system of separate buffers and a split index word to manage reading and writing the buffer at the same time. The message buffer in the above example buffers error messages in a processor, such as L2 cache dirty messages, memory error messages, or other such messages. In other embodiments of the invention the buffer will be used to buffer other types of data, such as network communication data, data communicated over a computer bus, or other such data. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A storage device containing instructions for controlling a computer to access data stored in a buffer having a first buffer portion and a second buffer portion, by a method comprising:
   providing a first index into the first buffer portion and a second index into the second buffer portion, the first index and the second index having values indicating which buffer portion is available for writing and which buffer portion is available for reading;
   writing data to the buffer by
      performing an atomic operation to fetch and increment both the first index and the second index; and
      storing data into the buffer based on which buffer portion is currently available for writing as indicated by the fetched indexes; and
   performing an atomic operation to load from and change the first index and the second index to switch which buffer portion is currently available for writing.

2. The storage device of claim 1 wherein the first index and the second index are stored at the same memory location.

3. The storage device of claim 1 wherein the storing of data into the buffer includes:
   determining which buffer portion is available for writing based on the fetched indexes;
   when the first buffer portion is available for writing, storing the data in the first buffer portion at a location derived from the fetched first index; and
   when the second buffer portion is available for writing, storing the data in the second buffer portion at a location derived from the fetched second index.

4. The storage device of claim 1 wherein multiple programs write to the buffer and a single program reads from the buffer.

5. The storage device of claim 1 wherein when storing data at a buffer entry having multiple memory locations, storing a value into a memory location of the buffer entry to indicate that the writing of data to the buffer entry is complete.

6. The storage device of claim 1 wherein the method includes reading data from the buffer portion that is not currently available for writing.

7. The storage device of claim 1 wherein the value of the index for the buffer portion previously available for writing fetched by the atomic operation to fetch from and store into indicates an amount of data currently available for reading.

8. The storage device of claim 3 wherein the first buffer portion has a first buffer size and the second buffer portion has a second buffer size and wherein the performing of the atomic operation to load from and change the first index and the second index includes:
  when the first buffer portion is currently available for writing,
    setting the first index to a number larger than the first buffer size; and
    setting the second index to a number smaller than the second buffer size; and
  when the second buffer portion is currently available for writing,
    setting the first index to a number smaller than the first buffer size; and
    setting the second index to a number larger than the second buffer size; and
wherein the first buffer portion is available for writing when the first index is smaller than the first buffer size and the second buffer portion is available for writing when the second index is smaller than the second buffer size.

9. The storage device of claim 3 wherein the performing of the atomic operation to load from and change the first index and the second index includes:
  when the first buffer portion is currently available for writing,
    setting the first index to point past a last entry of the first buffer portion; and
    setting the second index to point to a first entry of the second buffer portion; and
  when the second buffer portion is currently available for writing,
    setting the first index to point to a first entry of the first buffer portion; and
    setting the second index to point past a last entry of the second buffer portion; and
wherein the first buffer portion is available for writing when the first index points to an entry that is not past the last entry of the first buffer portion and the second buffer portion is available for writing when the second index points to an entry that is not past the last entry of the second buffer portion.

10. A buffer system comprising:
  a buffer having a first buffer portion and a second buffer portion;
  a first index into the first buffer portion and a second index into the second buffer portion, the first index and the second index having values indicating which buffer portion is available for writing and which buffer portion is available for reading; and
  a component that
    writes data to the buffer by
      performing an atomic operation to fetch and increment both the first index and the second index; and
      storing data into the buffer based on which buffer portion is currently available for writing as indicated by the fetched indexes; and
    switches which buffer portion is currently available for writing by performing an atomic operation to load from and change the first index and the second index.

11. The buffer system of claim 10 wherein the first index and the second index are stored at the same memory location.

12. The buffer system of claim 10 wherein the component stores data into the buffer by:
  determining which buffer portion is available for writing based on the fetched indexes;
  when the first buffer portion is available for writing, storing the data in the first buffer portion at a location derived from the fetched first index; and
  when the second buffer portion is available for writing, storing the data in the second buffer portion at a location derived from the fetched second index.

13. The buffer system claim 12 wherein the first buffer portion has a first buffer size and the second buffer portion has a second buffer size and wherein the performing of the atomic operation to load from and change the first index and the second index includes:
  when the first buffer portion is currently available for writing,
    setting the first index to a number larger than the first buffer size; and
    setting the second index to a number smaller than the second buffer size; and
  when the second buffer portion is currently available for writing,
    setting the first index to a number smaller than the first buffer size; and
    setting the second index to a number larger than the second buffer size; and
wherein the first buffer portion is available for writing when the first index is smaller than the first buffer size and the second buffer portion is available for writing when the second index is smaller than the second buffer size.

14. The buffer system of claim 12 wherein the performing of the atomic operation to load from and change the first index and the second index includes:
  when the first buffer portion is currently available for writing,
    setting the first index to point past a last entry of the first buffer portion; and
    setting the second index to point to a first entry of the second buffer portion; and
  when the second buffer portion is currently available for writing,
    setting the first index to point to a first entry of the first buffer portion; and
    setting the second index to point past a last entry of the second buffer portion; and
wherein the first buffer portion is available for writing when the first index points to an entry that is not past the last entry of the first buffer portion and the second buffer portion is available for writing when the second index points to an entry that is not past the last entry of the second buffer portion.

15. The buffer system of claim 10 wherein multiple writers write to the buffer and a single reader reads from the buffer.

16. The buffer system of claim 10 wherein when storing data at a buffer entry having multiple memory locations, the component stores a value into a memory location of the buffer entry to indicate that the writing of data to the buffer entry is complete.

17. The buffer system of claim 10 wherein the component further reads data from the buffer portion that is not currently available for writing.

18. The buffer system of claim 10 wherein the value of the index for the buffer portion previously available for writing fetched by the atomic operation to fetch from and store into indicates an amount of data currently available for reading.

19. A method performed by a computer system to access data stored in a buffer having a first buffer portion and a second buffer portion and having a first index into the first buffer portion and a second index into the second buffer portion, the first index and the second index having values indicating which buffer portion is available for writing and which buffer portion is available for reading, the method comprising:

writing data to the buffer by performing an atomic operation to fetch and increment both the first index and the second index; and storing data into the buffer based on which buffer portion is currently available for writing as indicated by the fetched indexes; and switching which buffer portion is currently available for writing by performing an atomic operation to load from and change the first index and the second index.

20. The method of claim 19 wherein the first index and the second index are stored at the same memory location.

21. The method of claim 19 wherein the storing of data into the buffer includes:

determining which buffer portion is available for writing based on the fetched indexes;

when the first buffer portion is available for writing, storing the data in the first buffer portion at a location derived from the fetched first index; and when the second buffer portion is available for writing, storing the data in the second buffer portion at a location derived from the fetched second index.

22. The method of claim 21 wherein the first buffer portion has a first buffer size and the second buffer portion has a second buffer size and wherein the performing of the atomic operation to load from and change the first index and the second index includes:

when the first buffer portion is currently available for writing, setting the first index to a number larger than the first buffer size; and setting the second index to a number smaller than the second buffer size; and when the second buffer portion is currently available for writing, setting the first index to a number smaller than the first buffer size; and setting the second index to a number larger than the second buffer size; and wherein the first buffer portion is available for writing when the first index is smaller than the first buffer size and the second buffer portion is available for writing when the second index is smaller than the second buffer size.

23. The method of claim 21 wherein the performing of the atomic operation to load from and change the first index and the second index includes:

when the first buffer portion is currently available for writing, setting the first index to point past a last entry of the first buffer portion; and setting the second index to point to a first entry of the second buffer portion; and when the second buffer portion is currently available for writing, setting the first index to point to a first entry of the first buffer portion; and setting the second index to point past a last entry of the second buffer portion; and wherein the first buffer portion is available for writing when the first index points to an entry that is not past the last entry of the first buffer portion and the second buffer portion is available for writing when the second index points to an entry that is not past the last entry of the second buffer portion.

24. The method of claim 19 wherein multiple writers write to the buffer and a single reader reads from the buffer.

25. The method of claim 19 wherein when storing data at a buffer entry having multiple memory locations, storing a value into a memory location of the buffer entry to indicate that the writing of data to the buffer entry is complete.

26. The method of claim 19 including reading data from the buffer portion that is not currently available for writing.

27. The method of claim 19 wherein the value of the index for the buffer portion previously available for writing fetched by the atomic operation to fetch from and store into indicates an amount of data currently available for reading.

* * * * *